Patented Oct. 12, 1948

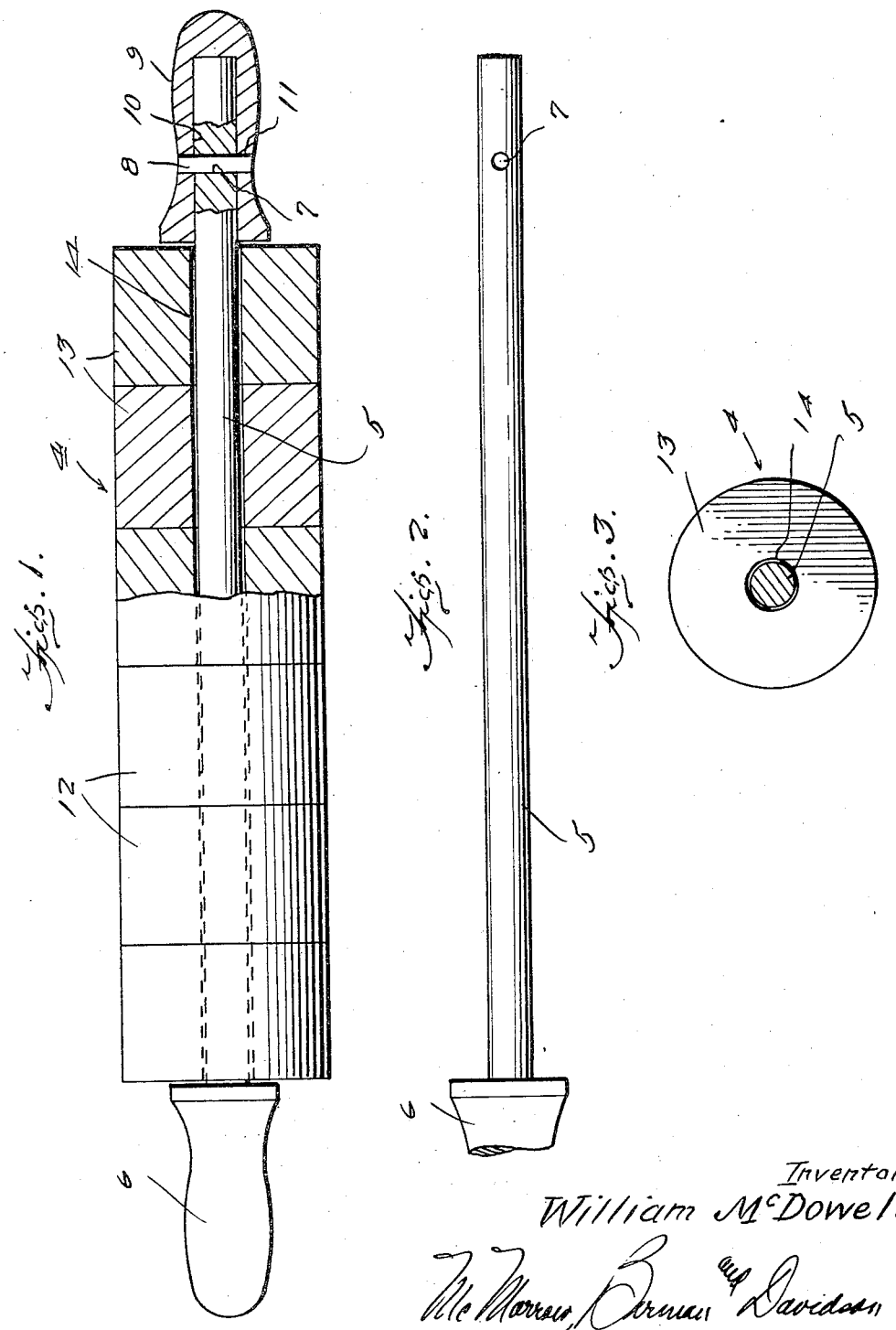

2,451,170

UNITED STATES PATENT OFFICE 2,451,170

ROLLING PIN

William McDowell, Glendale, Calif.

Application July 19, 1946, Serial No. 684,738

1 Claim. (Cl. 107—50)

1

This invention relates to rolling pins, and the primary object of the invention is to provide a rolling pin whose roller element, instead of being of one-piece construction, is composed of a plurality of independently rotatable roller sections loosely mounted on a shaft extending between the handles, whereby the rolling pin can be manipulated more flexibly with respect to the dough or the like to be rolled, without producing unwanted distortions of the dough or the like.

Another important object of this invention is to provide a rolling pin of the character indicated above which can be turned in a circle while rolling the dough so as to produce a regular figure in the dough, or rolled forwardly and backwardly or sidewise in a straight line to produce irregular rolling of the dough.

Another important object of this invention is to provide a rolling pin of the character indicated above which can be made in a rugged and mechanically efficient form at relatively low cost.

Other important objects and advantageous features of the invention will be apparent from the following description and accompanying drawings, wherein for purposes of illustration only, a preferred embodiment of the invention is set forth in detail.

In the drawings:

Figure 1 is a side elevation, partly broken away to show structural details.

Figure 2 is an elevation of the roller shaft, and

Figure 3 is a transverse section.

Referring to the drawings in detail, the numeral 4 generally designates the illustrated rolling pin, which comprises the cylindrical relatively small diameter roller shaft 5, provided on one end with an integral handle 6 of larger diameter than the shaft, and formed at the opposite end with a transverse bore 7 to accommodate a removable cross pin 8 for securing on the shaft a removable handle 9 having an axial socket 10 receiving the shaft and registered transverse bores 11 receiving the ends of the cross pin 8. The handle 9 is thereby readily removable and replaceable whenever it is desired to change the position of or replace any of the sections of the roller 12.

The roller 12 is composed of a plurality of similar short cylindrical roller sections 13 having axial bores 14 loosely and rotatably receiving the

2 shaft 5, and placed in end to end relation so as to occupy the space between the inner ends of the handles 6 and 9, with sufficient clearance to enable the individual roller sections to turn freely relative to each other and the shaft 5.

It will be obvious from the foregoing that in manipulating the roller pin upon a body of dough for rolling it in a well known manner, the individual roller sections 13 can, due to their loose mounting on the shaft 5, rise and fall slightly with respect to each other and the shaft 5, besides being capable of turning in different degrees with respect to each other, in the same, and in reversed or opposite directions, in accordance with the condition of the dough and the direction and angle in which the rolling pin is manipulated by the operator. As a consequence, for example, by turning the rolling pin circularly it is easily feasible to roll a circular flat plane of dough, whereas with an ordinary rolling pin this result is unobtainable by a person of ordinary skill because of the fact that all points along an integral rolling pin turn in the same direction and one end of such a rolling pin has a tendency to sink deeper than the other end and scuff the dough.

What is claimed is:

A rolling pin, comprising a shaft, a plurality of roller sections, each of said sections being formed with an axial bore of slightly larger diameter than said shaft, and means mounting said sections on said shaft for free limited lateral movement and free rotational movement relative to each other and to said shaft.

WILLIAM McDOWELL.

REFERENCES CITED

The following references are of record in the file of this patent:

UNITED STATES PATENTS

| Number | Name | Date |
|---|---|---|
| 267,060 | Buell | Nov. 7, 1882 |
| 1,262,862 | Staaff et al. | Apr. 16, 1918 |

FOREIGN PATENTS

| Number | Country | Date |
|---|---|---|
| 16,628 | Great Britain | Sept. 17, 1892 |
| 24,618 | Great Britain | Dec. 11, 1899 |